United States Patent
Komori

(10) Patent No.: US 12,528,436 B2
(45) Date of Patent: *Jan. 20, 2026

(54) APPARATUS FOR PROTECTING PEDESTRIAN FROM VEHICLE COLLISION

(71) Applicant: HONDA MOTOR CO., LTD., Tokyo (JP)

(72) Inventor: Kenji Komori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 260 days.

This patent is subject to a terminal disclaimer.

(21) Appl. No.: 18/116,155

(22) Filed: Mar. 1, 2023

(65) Prior Publication Data

US 2023/0303021 A1 Sep. 28, 2023

(30) Foreign Application Priority Data

Mar. 22, 2022 (JP) ................................ 2022-045996

(51) Int. Cl.
*B60R 21/013* (2006.01)
*B60R 21/0132* (2006.01)
*B60R 21/00* (2006.01)
*B60R 21/01* (2006.01)

(52) U.S. Cl.
CPC ........ *B60R 21/0133* (2014.12); *B60R 21/013* (2013.01); *B60R 2021/003* (2013.01); *B60R 2021/01286* (2013.01); *B60R 2021/01322* (2013.01)

(58) Field of Classification Search
CPC .............. B60R 21/013; B60R 21/0133; B60R 2021/003; B60R 2021/01286; B60R 2021/01322
See application file for complete search history.

(56) References Cited

U.S. PATENT DOCUMENTS

| 9,598,077 | B2 | 3/2017 | Yamakado et al. |
| 9,919,603 | B2 | 3/2018 | Yamakado et al. |
| 10,988,105 | B2 | 4/2021 | Gunji et al. |
| 2004/0107033 | A1* | 6/2004 | Rao ........................ B60R 21/013 348/148 |
| 2016/0288765 | A1* | 10/2016 | Brodie ............... A63B 69/0057 |

(Continued)

FOREIGN PATENT DOCUMENTS

| CN | 110816465 A | 2/2020 |
| EP | 0914992 A1 | 5/1999 |

(Continued)

OTHER PUBLICATIONS

Office Action dated Aug. 5, 2025, issued in counterpart CN Application No. 202310190676.0, with English translation. (20 pages).

*Primary Examiner* — Scott A Browne
*Assistant Examiner* — Izcalli Rios-Aguirre
(74) *Attorney, Agent, or Firm* — WHDA, LLP

(57) ABSTRACT

A vehicle, comprising a monitoring unit configured to monitor a surrounding environment of a vehicle body, a detection unit configured to detect an impact applied onto the vehicle body, a plurality of impact absorption units, and an operation control unit configured to selectively operate the plurality of impact absorption units, based on at least one of a monitoring result from the monitoring unit and a detection result from the detection unit.

10 Claims, 5 Drawing Sheets

(56) References Cited

U.S. PATENT DOCUMENTS

| | | | |
|---|---|---|---|
| 2019/0070986 A1* | 3/2019 | Sharif | B60N 2/42718 |
| 2020/0377053 A1* | 12/2020 | Umezawa | B60W 30/095 |
| 2021/0197757 A1* | 7/2021 | Nagasawa | B60R 19/205 |
| 2021/0245701 A1* | 8/2021 | Haltom | G06V 40/10 |
| 2023/0150450 A1* | 5/2023 | Wang | B60R 21/0132 |
| | | | 701/45 |
| 2023/0242154 A1* | 8/2023 | Difrancesco | B60W 30/085 |
| | | | 701/23 |

FOREIGN PATENT DOCUMENTS

| | | |
|---|---|---|
| FR | 2813053 A1 | 2/2002 |
| JP | 2003-226211 A | 8/2003 |
| JP | 6138655 B2 | 5/2017 |
| JP | 6204865 B2 | 9/2017 |
| JP | 6375034 B2 | 8/2018 |
| JP | 2019-206287 A | 12/2019 |
| KR | 20160059822 A | 5/2016 |

* cited by examiner

APPARATUS FOR PROTECTING PEDESTRIAN FROM VEHICLE COLLISION

CROSS-REFERENCE TO RELATED APPLICATION(S)

This application claims priority to and the benefit of Japanese Patent Application No. 2022-045996, filed on Mar. 22, 2022, the entire disclosure of which is incorporated herein by reference.

BACKGROUND OF THE INVENTION

Field of the Invention

The present invention relates to an operation mode of an impact absorption unit to be mainly mounted on a vehicle.

Description of the Related Art

Japanese Patent Laid-Open No. 2019-206287 describes a vehicle equipped with airbags for pedestrians, as impact absorption units for protecting objects that are likely to come into contact with a vehicle body. According to Japanese Patent Laid-Open No. 2019-206287, the impact absorption unit is operated, based on a time to collision (TTC).

A further improvement in the technique of operating the impact absorption unit may be generally demanded to protect an object in a more appropriate manner.

SUMMARY OF THE INVENTION

The present invention enables protection of an object in a more appropriate manner by use of an impact absorption unit.

One of the aspects of the present invention provides a vehicle, comprising a monitoring unit configured to monitor a surrounding environment of a vehicle body, a detection unit configured to detect an impact applied onto the vehicle body, a plurality of impact absorption units, and an operation control unit configured to selectively operate the plurality of impact absorption units, based on at least one of a monitoring result from the monitoring unit and a detection result from the detection unit.

Further features of the present invention will become apparent from the following description of exemplary embodiments with reference to the attached drawings.

DESCRIPTION OF THE EMBODIMENTS

Figure 1:
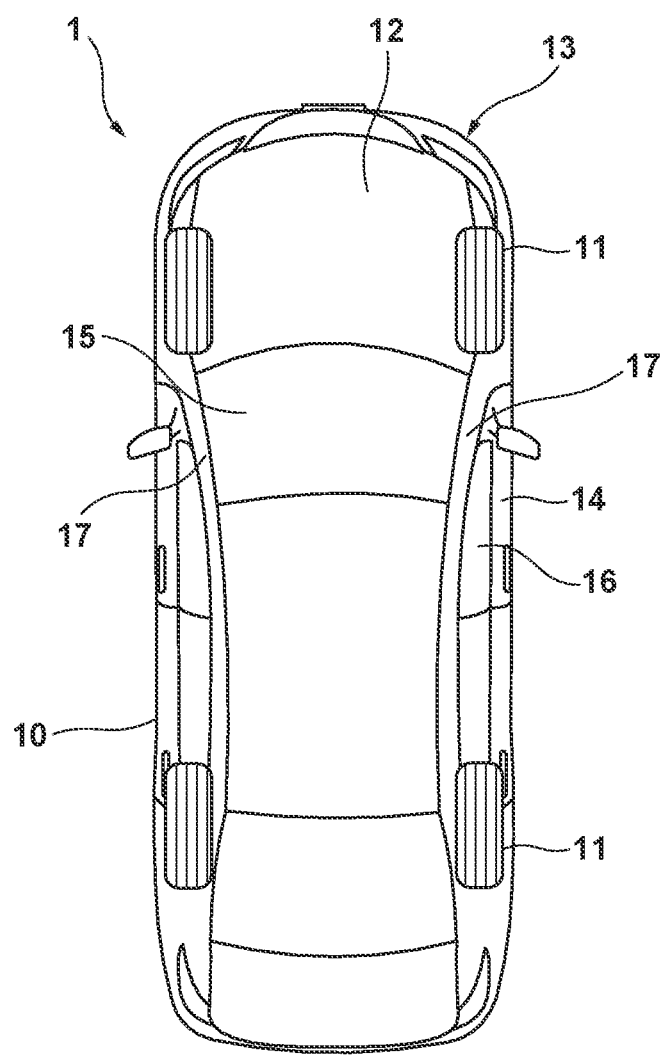
FIG. 1 is a diagram illustrating an example of a structure of a vehicle according to an embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a diagram illustrating an example of a structure of a vehicle 1 according to an embodiment. In the drawing, x-axis, y-axis, and z-axis that are orthogonal to each other are illustrated in order to facilitate understanding of the structure. X direction corresponds to a front-and-rear direction of a vehicle body, Y direction corresponds to a left-right direction of the vehicle body or a vehicle width direction, and Z direction corresponds to an up-down direction of the vehicle body or a height direction.

The vehicle 1 includes wheels 11, a bonnet hood 12, a front bumper 13, side doors 14, a windshield 15, door glasses 16, and pillars 17. In the present embodiment, the vehicle 1 is a four-wheeled vehicle including two front wheels and two rear wheels as the wheels 11, but the number of the wheels 11 is not limited to this example.

The bonnet hood (front hood) 12 is provided to be openable and closable above a front-side portion of the vehicle body 10, and seals in-vehicle components, for example, a power source and the like. The front bumper 13 is installed below the front-side portion of the vehicle body 10. The side doors 14 are each provided to be openable and closable in a lateral part of the vehicle body 10, and enables an occupant such as a driver to get in the vehicle or get off the vehicle. The windshield 15 is provided in a front portion of an upper part of the vehicle body 10 so that the occupant in the vehicle is able to visually recognize situations outside the vehicle. The door glasses 16 are each provided in an upper portion of the side door 14 so that the occupant in the vehicle is able to visually recognize situations outside the vehicle. The pillars 17 are each interposed between the windshield 15 and the door glass 16 so as to define the windshield 15, and are each customarily expressed as an A-pillar 17, which is distinguishable from other pillars (so-called a B-pillar and the like).

Note that the door glass 16 is generally openable and closable by moving up and down with respect to the side door 14, but will be described as a closed state in the following description. In addition, a frame part that surrounds the door glass 16 may be provided in the side door 14.

Figure 2:
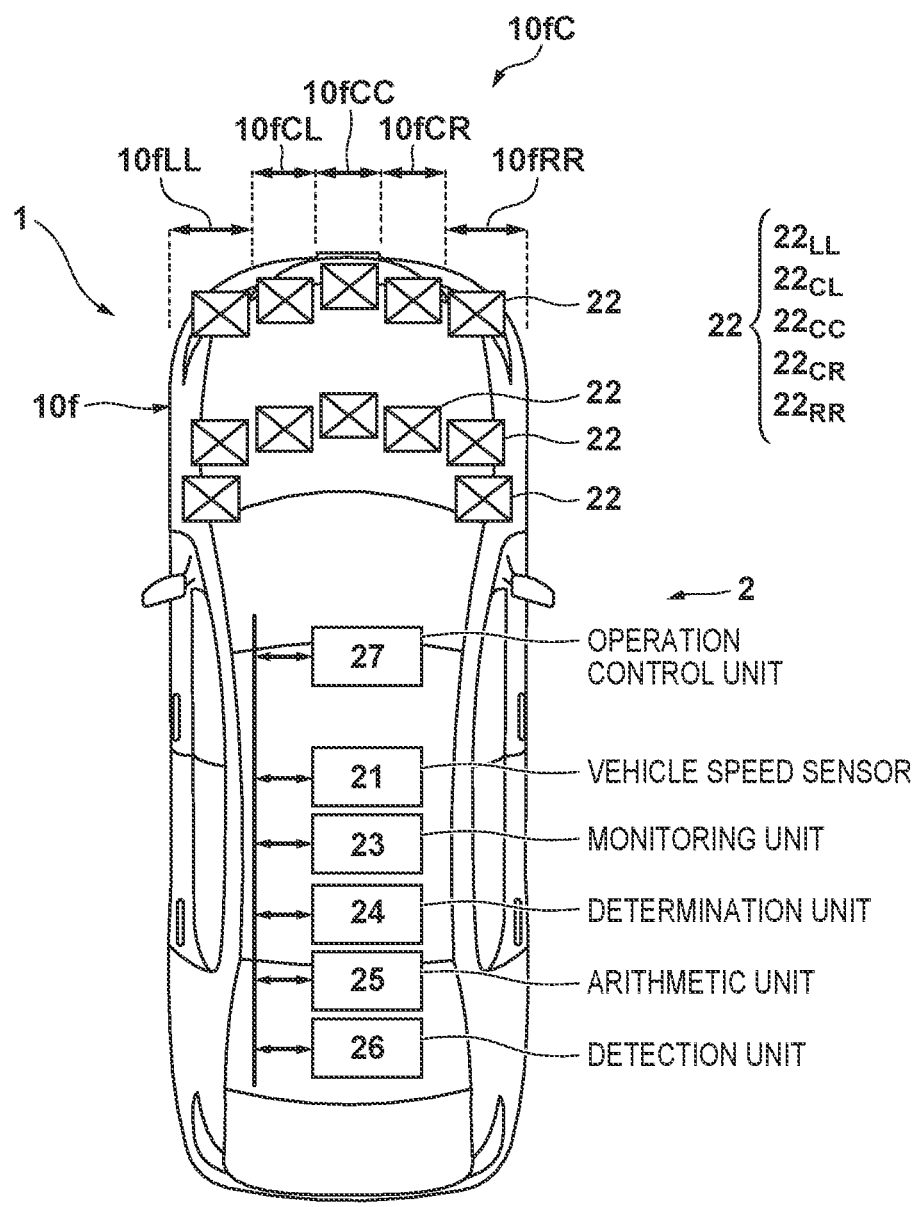
FIG. 2 is a schematic diagram illustrating an example of a configuration of an electric device group included in the vehicle.

As illustrated in FIG. 2, the vehicle 1 further includes an electric device group 2. The electric device group 2 includes a vehicle speed sensor 21, a plurality of impact absorption units 22, a monitoring unit 23, a determination unit 24, an arithmetic unit 25, a detection unit 26, and an operation control unit 27. These units may be disposed in a distributed manner respectively in corresponding positions of the vehicle body 10, or may be disposed collectively in specific positions.

The vehicle speed sensor 21 detects a vehicle speed (traveling speed of the vehicle 1). For the vehicle speed sensor 21, it is sufficient if any known one capable of directly or indirectly acquiring the vehicle speed is used. For example, a sensor for detecting the rotation speed of the wheel 11 is usable. Alternatively, the vehicle speed may be calculated, based on continuously acquired location data by use of a sensor capable of identifying the location of the vehicle 1, such as a global positioning system (GPS).

The plurality of impact absorption units 22 are installed to respectively correspond to a plurality of portions of the vehicle body 10. For the impact absorption unit 22, it is sufficient if any known one capable of absorbing an impact that can be applied to an object to be described later is used. When the impact absorption unit 22 is operated or activated, a cloth bag filled with, for example, gas is deployed forward the vehicle body 10, and thus functions as a cushion member.

At least some of the plurality of impact absorption units 22 can be installed in different positions from each other in the vehicle width direction and/or installed in different positions from each other in the height direction. For example, at least some of the plurality of impact absorption units 22 are installed to respectively correspond to the bonnet hood 12, the front bumper 13, and the A-pillars 17. The impact absorption unit 22 corresponding to the bonnet hood 12 is installed between the bonnet hood 12 and the windshield 15, and can be deployed above the bonnet hood 12 when operated. The impact absorption unit 22 corresponding to the front bumper 13 is installed below the front-side portion of the vehicle body 10, and can be deployed forward the front bumper 13 when operated. In addition, the impact absorption unit 22 corresponding to the A-pillar 17 is installed between the bonnet hood 12 and the windshield 15, and can be deployed forward the A-pillar 17 when operated.

As illustrated in FIG. 2, in a case where a front-side portion 10$f$ of the vehicle body 10 is divided into a front-side front surface portion 10$f$C, a front-side left lateral portion 10$f$LL, and a front-side right lateral portion 10$f$RR, at least some of the plurality of impact absorption units 22 are installed to respectively correspond to the portions 10$f$C, 10$f$LL, and 10$f$RR. In the present embodiment, in a case where W is set to the size in the vehicle width direction, the front-side left lateral portion 10$f$LL corresponds to an area equal to or smaller than W×0.14 from a left lateral end of the vehicle body 10, and the front-side right lateral portion 10$f$RR corresponds to an area equal to or smaller than W×0.14 from a right lateral end of the vehicle body 10. It is assumed that the front-side front surface portion 10$f$C corresponds to an area between the portions 10$f$LL and 10$f$RR.

The front-side front surface portion 10$ft$ may be further divided into details. In the present embodiment, it is assumed that the front-side front surface portion 10$f$C includes a front surface central portion 10$f$CC, a front surface left lateral portion 10$f$CL, and a front surface right lateral portion 10$f$CR. The front surface left lateral portion 10$f$CL corresponds to an area within a range of W×0.14 to W×0.25 from the left lateral end of the vehicle body 10, and the front surface right lateral portion 10$f$CR corresponds to an area within a range of W×0.14 to W×0.25 from the right lateral end of the vehicle body 10. It is assumed that the front surface central portion 10$f$CC corresponds to an area between the portions 10$f$CL and 10$f$CR.

In order to facilitate the description,
the impact absorption unit 22 corresponding to the front-side left lateral portion 10$f$LL is defined as a unit $22_{LL}$,
the impact absorption unit 22 corresponding to the front surface left lateral portion 10$f$CL is defined as a unit $22_{CL}$,
the impact absorption unit 22 corresponding to the front surface central portion 10$f$CC is defined as a unit $22_{CC}$,
the impact absorption unit 22 corresponding to the front surface right lateral portion 10$f$CR is defined as a unit $22_{CR}$, and
the impact absorption unit 22 corresponding to the front-side right lateral portion 10$f$RR is defined as a unit $22_{RR}$.

Although details will be described later, the above-described plurality of impact absorption units 22 are each selectively operated in accordance with satisfaction of a predetermined condition.

Note that the method for dividing into the portions 10$f$LL, 10$f$CL, 10$f$CC, 10$f$CR, and 10$f$RR can be changed in accordance with the vehicle body structure. In addition, the front-side portion 10$f$ of the vehicle body 10 may be further divided into details in accordance with the vehicle body structure, and the number of divided portions is not limited to this example. Further, the portions 10$f$LL and the like may be expressed as an area 10$f$LL and the like.

The monitoring unit 23 monitors a surrounding environment of the vehicle body 10. The surrounding environment includes information necessary for the vehicle 1 to travel in an appropriate manner, and its examples include a travel environment in the surroundings of the vehicle body 10 (for example, a road), objects in the surroundings of the vehicle body 10 (elements with which contact should be avoided, for example, an installation object, another vehicle, a pedestrian, and the like), and the like. For the monitoring unit 23, it is sufficient if any known one is used, and for example, a camera, a radar, a light detection and ranging (LiDAR), or the like is used.

The determination unit 24 is capable of determining an attribute of an object that is likely to come into contact with the vehicle body 10, based on a monitoring result of the monitoring unit 23. For example, the determination unit 24 determines whether the object that is likely to come into contact with the vehicle body 10 is a human. This determination processing will be simply expressed as a determination in the following.

It is assumed that the determination unit 24 makes a determination in a case where a detection result of the vehicle speed sensor 21 satisfies a reference, and makes a determination for an object located within a range corresponding to the detection result of the vehicle speed sensor 21. For example, the determination unit 24 determines an object within a distance Dp from the vehicle body 10 in a case where the vehicle speed V=Vp, and determines an object within the distance Dq (>Dp) from the vehicle body 10 in a case where the vehicle speed V=Vq (>Vp). This makes it possible to prevent an unnecessary determination.

As another embodiment, the above determination for the object may be conducted regardless of the detection result of the vehicle speed sensor 21, and then, another processing may be incidentally performed, based on the detection result of the vehicle speed sensor 21.

The arithmetic unit 25 identifies a characteristic part of an object when the object is likely to come into contact with the vehicle body 10, based on a monitoring result of the monitoring unit 23, and identifies a contact position of the vehicle body 10 to be contacted with the characteristic part that has been identified. Two or more characteristic parts may be identified in accordance with an attribute of the object. For example, in a case where the object is a human, three characteristic parts of a neck part and left and right shoulder parts of the human are identifiable. In addition, left and right leg parts of the human may be further identified as the characteristic parts, and five characteristic parts in total may be identified. The leg part to be identified may be a part of it. Its examples typically include, but are not limited to, heel and ankle.

The detection unit 26 detects an impact applied onto the vehicle body 10. For the detection unit 26, it is sufficient if any known sensor is used. For example, it is sufficient if an acceleration sensor is used. The detection unit 26 is installed in each of a plurality of positions of the vehicle body 10, and some of the plurality of impact absorption units 22 are installed to respectively correspond to the plurality of detection units 26.

The operation control unit 27 is capable of selectively operating the plurality of impact absorption units 22, and is capable of operating at least one or all of them. For example, when an impact is detected by any of the plurality of detection units 26, the operation control unit 27 operates the impact absorption unit 22 corresponding to the detection unit 26, which has detected the impact.

In addition, for example, in a case where a human is the object that has been determined by the determination unit 24 to be likely to come into contact with the vehicle body 10, based on a monitoring result from the monitoring unit 23, the operation control unit 27 operates the impact absorption unit 22 corresponding to a contact position of the vehicle body 10 to be contacted with the human's characteristic part. As described above, in the case where the object is a human, three characteristic parts that are the neck part and the left and right shoulder parts of the human are identifiable. In such a case, the operation control unit 27 operates at least one or all of the impact absorption units $22_{LL}$, $22_{CL}$, $22_{CC}$, $22_{CR}$, and $22_{RR}$, based on which of the portions **10*f*LL, 10*f*CL, 10*f*CC, 10*f*CR, and 10*f*RR in the front-side portion 10*f* of the vehicle body 10** the contact positions to be contacted with the three characteristic parts respectively correspond to.

In this manner, the operation control unit 27 selectively operates the plurality of impact absorption units 22, based on the monitoring result from the monitoring unit 23 and the detection result from the detection unit 26.

At least one of the plurality of impact absorption units 22 may operate based on both the monitoring result from the monitoring unit 23 and the detection result from the detection unit 26, or may operate based on either one of them. For example, at least one of the plurality of impact absorption units 22 may operate only based on the monitoring result from the monitoring unit 23, or at least one of the plurality of impact absorption units 22 may operate only based on the detection result from the detection unit 26.

According to the above configuration, the electric device group 2 is capable of more appropriately protecting the object that is likely to come into contact with the vehicle body 10 by use of the plurality of impact absorption units 22. From this viewpoint, the electric device group 2 may be expressed as an impact absorption apparatus, a safety apparatus, or the like.

Figure 3:
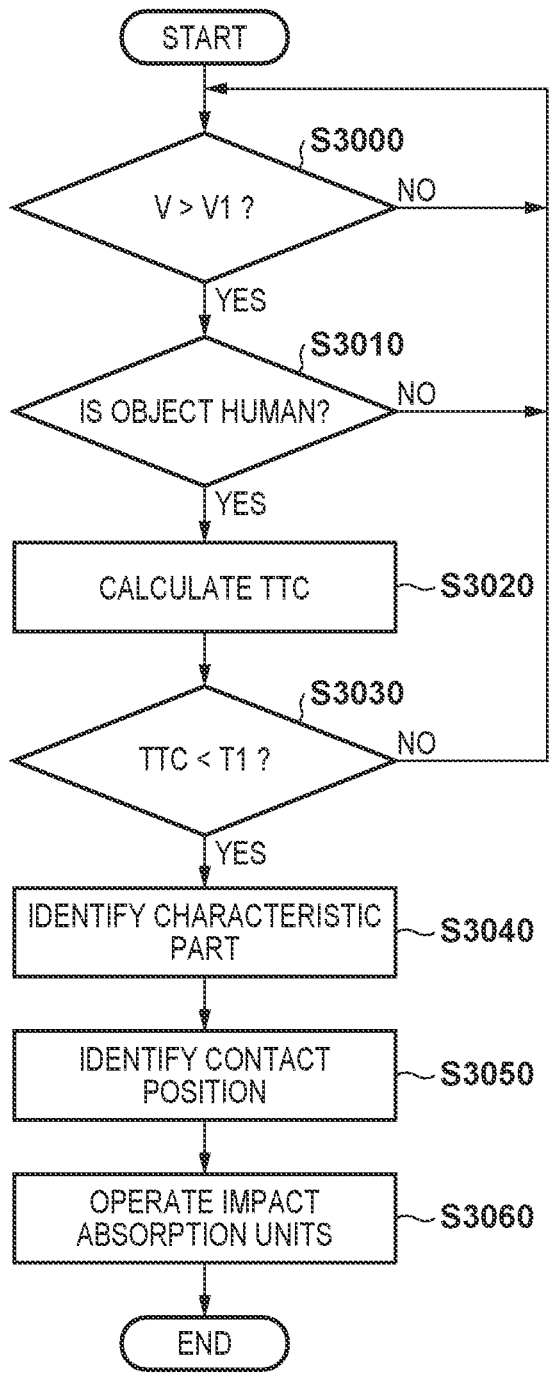
FIG. 3 is a flowchart illustrating an example of an operation method of an impact absorption unit.

FIG. 3 is a flowchart illustrating an example of an operation method for operating the plurality of impact absorption units 22. The present flowchart is mainly performed by the operation control unit 27, and its outline is to selectively operate the plurality of impact absorption units 22, based on a contact position of the vehicle body 10 to be contacted with a characteristic part of an object that has been detected by the detection unit 26.

In step S3000 (hereinafter, simply referred to as "S3000"), it is determined whether the vehicle speed V is larger than a reference value V1. It is sufficient if a predetermined speed at which the operation of the impact absorption unit 22 is needed is set to the reference value V1. For example, 15 km (kilometers)/hr (hour), 30 km/hr, 45 km/hr, 60 km/hr, or the like can be set. In a case where the vehicle speed V is larger than the reference value V1, the processing proceeds to S3010. In the other cases, the processing returns to S3000 (alternatively, this flowchart may be ended).

In S3010, it is determined whether the object that has been detected by the monitoring unit 23 is a human. In a case where the object is a human, the processing proceeds to S3020, and in the other cases, the processing returns to S3000.

In S3020, a time to collision (TC) of the object that has been determined as a human is calculated The TTC is calculated as a period of time until the vehicle 1 reaches the object in a case where it is assumed that the relative speeds of the vehicle 1 and the object are maintained as they are. In addition, by reference to in Japanese Patent No. 6375034, Japanese Patent No. 6204865, and Japanese Patent No. 6138655, the TTC can be typically used as a parameter indicating an evaluation for a degree of security during traveling.

In S3030, it is determined whether the TTC is smaller than a reference value T1. It is sufficient if a predetermined period during which the operation of the impact absorption unit 22 is needed is set to the reference value T1, and one second, three seconds, five seconds, or the like can be set. As another example, the reference value T1 may be a fixed value, but may be a variable value that varies, based on a posture of a human as an object (that is, in which direction the object faces with respect to the front surface of the vehicle body 10, for example, whether the object faces the front surface, the rear surface, the left lateral side, or the right lateral side) and/or a moving direction with respect to the vehicle body 10. As an example, in a case where the human is facing a lateral side or in a case where the human is moving in a lateral direction, a smaller value than that in a case where the human is facing the front surface can be set to the reference value T1. In a case where the TTC is smaller than the reference value T1, the processing proceeds to S3040, and in the other cases, the processing returns to S3000.

In S3040, a characteristic part of the object that has been determined as a human is identified. As described above, in the case where the object is a human, three characteristic parts that are the neck part and the left and right shoulder parts of the human are identifiable. This processing is achievable by conducting an image analysis using a known human body analysis model. Accordingly, it becomes possible to determine the posture appropriately. In addition, as described above, five characteristic parts in total further including left and right leg parts of the human may be identified. Thus, the above determination is achievable in a more appropriate manner.

In S3050, it is identified which one of the portions **10*f*LL, 10*f*CL, 10*f*CC, 10*f*CR, and 10*f*RR in the front-side portion 10*f* of the vehicle body 10 the contact position to be contacted with the characteristic part corresponds to. This processing is achievable in a predetermined arithmetic process using an advancing direction or a travel route of the vehicle 1 and a relative position of the vehicle body 10** to be contacted with the characteristic part as input information. Incidentally, a moving direction and a moving speed of the object may be further used as the input information.

In S3060, from among the plurality of impact absorption units 22, at least one of them corresponding to an identification result of S3050 is operated. This processing is performed here by operating all or at least one of the impact absorption units 22 corresponding to all or at least one of the three characteristic parts, based on the above-described portion **10*f*LL** or the like corresponding to all or at least one of the three characteristic parts. Here, it is possible to determine the posture of the human as the object, based on the three characteristic parts identified in S3040. Therefore, in S3060, from among the plurality of impact absorption units 22, at least one of them corresponding to the characteristic part is to be appropriately activated.

According to the above embodiment, in the case where the vehicle speed V is larger than the reference value V1 and the object that has been detected by the monitoring unit 23 is a human and the TTC is smaller than the reference value T1, the plurality of impact absorption units 22 are selectively operated, based on the monitoring result from the monitoring unit 23 regardless of the detection result from the detection unit 26. From among the plurality of impact absorption units 22, at least one of them corresponding to the contact position of the vehicle body 10 to be contacted with the characteristic part of the object that has been detected by the monitoring unit 23 is selectively operated, so that the object can be protected in an appropriate manner. In addition, by at least appropriate one of the plurality of impact absorption units 22 being operated, its operation becomes promptly achievable, and it is advantageous for achieving more appropriate protection of the object.

Further, as described above, at least some of the plurality of impact absorption units 22 can be installed at different positions from each other in the height direction. Accordingly, it becomes possible for the impact absorption unit 22 corresponding to the contact position to more appropriately protect the head part, arm part, leg part, and the like of the human as the object to be protected.

All or at least one of the components constituting the electric device group 2 may be configured with a central processing unit (CPU) and a memory, and its or their functions may be implemented by the CPU executing a predetermined program while developing the program on the memory. Alternatively, its or their functions may be implemented by at least one processor circuit including a memory in which a predetermined program is stored, and may be implemented by, for example, a semiconductor device such as an application specific integrated circuit (ASIC). That is, each function of the electric device group 2 may be achieved by either hardware or software.

A part of the components constituting the electric device group 2 may be changed without departing from the gist, and for example, all or a part of the components constituting the electric device group 2 may be configured with a single unit. As an example, the determination unit 24 and the arithmetic unit 25 may be integrally configured, the determination unit 24 may include a part of functions of the arithmetic unit 25, or the arithmetic unit 25 may include a part of functions of the determination unit 24.

First Example

The following is an example of a table indicating a correspondence relationship of the impact absorption units 22 to be operated in S3060. For example, from among the three characteristic parts, in a case where three characteristic parts correspond to the portion 10/LL, the impact absorption unit 22 corresponding to the left-side A-pillar 17 is operated,
in a case where two (or one) characteristic parts correspond to the portion 10/LL and one (or two) characteristic part corresponds to the portion 10/C (any of the portions 10/CL, 10/CC, and 10/CR), the impact absorption units 22 corresponding to the bonnet hood 12 and the left-side A-pillar 17 are operated,
in a case where three characteristic parts correspond to the portion 10/C, the impact absorption unit 22 corresponding to the bonnet hood 12 is operated,
in a case where two (or one) characteristic parts correspond to the portion 10/C and one (or two) characteristic part corresponds to the portion 10/RR, the impact absorption units 22 corresponding to the bonnet hood 12 and the right-side A-pillar 17 are operated, and
in a case where three characteristic parts correspond to the portion 10/RR, the impact absorption unit 22 corresponding to the right-side A-pillar 17 is operated.

In this manner, from among the plurality of impact absorption units 22, it is sufficient if at least one of them capable of handling the contact position of the vehicle body 10 to be contacted with the characteristic part is operated. Thus, it becomes possible to protect the object appropriately and its operation becomes promptly achievable.

Second Example

The plurality of impact absorption units 22 are respectively provided to correspond to a plurality of positions of the vehicle body 10, and the impact absorption units $22_{LL}$, $22_{CL}$, $22_{CC}$, $22_{CR}$, and $22_{RR}$ are respectively provided to correspond to the portions 10/LL, 10/CL, 10/CC, 10/CR, and 10/RR.

The following is another example of the table indicating the correspondence relationship of the impact absorption units 22 to be operated in S3060. For example, from among the three characteristic parts, in a case where three characteristic parts correspond to the portion 10/LL, the impact absorption unit 22 corresponding to the left-side A-pillar 17 and the impact absorption unit $22_{LL}$ are operated,
in a case where two characteristic parts correspond to the portion 10/LL and one characteristic part corresponds to the portion 10/CL, the impact absorption unit 22 corresponding to the left-side A-pillar 17 and the impact absorption units $22_{LL}$ and $22_{CL}$ are operated,
in a case where one characteristic part corresponds to the portion 10/LL and two characteristic parts correspond to the portion 10/CL, the impact absorption unit 22 corresponding to the left-side A-pillar 17 and the impact absorption units $22_{LL}$, $22_{CL}$, and $22_{CC}$ are operated,
in a case where one to three characteristic parts correspond to any of the portions 10/CL, 10/CC, and 10/CR, the impact absorption units $22_{LL}$, $22_{CL}$, $22_{CC}$, $22_{CR}$ and $22_{RR}$ are operated,
in a case where two characteristic parts correspond to the portion 10/CR and one characteristic part corresponds to the portion 10/RR, the impact absorption unit 22 corresponding to the right-side A-pillar 17 and the impact absorption units $22_{CC}$, $22_{CR}$, and $22_{RR}$ are operated,
in a case where one characteristic part corresponds to the portion 10/CR and two characteristic parts correspond to the portion 10/RR, the impact absorption unit 22 corresponding to the right-side A-pillar 17 and the impact absorption units $22_{CR}$ and $22_{RR}$ are operated, and
in a case where the three characteristic parts correspond to the portion 10/RR, the impact absorption unit 22 corresponding to the right-side A-pillar 17 and the impact absorption unit $22_{RR}$ are operated.

In this manner, in a case where a relatively large number of the impact absorption units 22 are provided, from among the plurality of impact absorption units 22, at least one of them capable of handling the contact position of the vehicle body 10 to be contacted with the characteristic part and another one in its periphery may be operated.

Third Example

In the example of FIG. 3, the description has been given with regard to the mode of selectively operating the plurality of impact absorption units 22, in the case where the vehicle speed V is larger than the reference value V1 (see S3000) and the predetermined condition is satisfied. However, the operation method thereof is partially changeable, based on another reference value.

Figure 4:
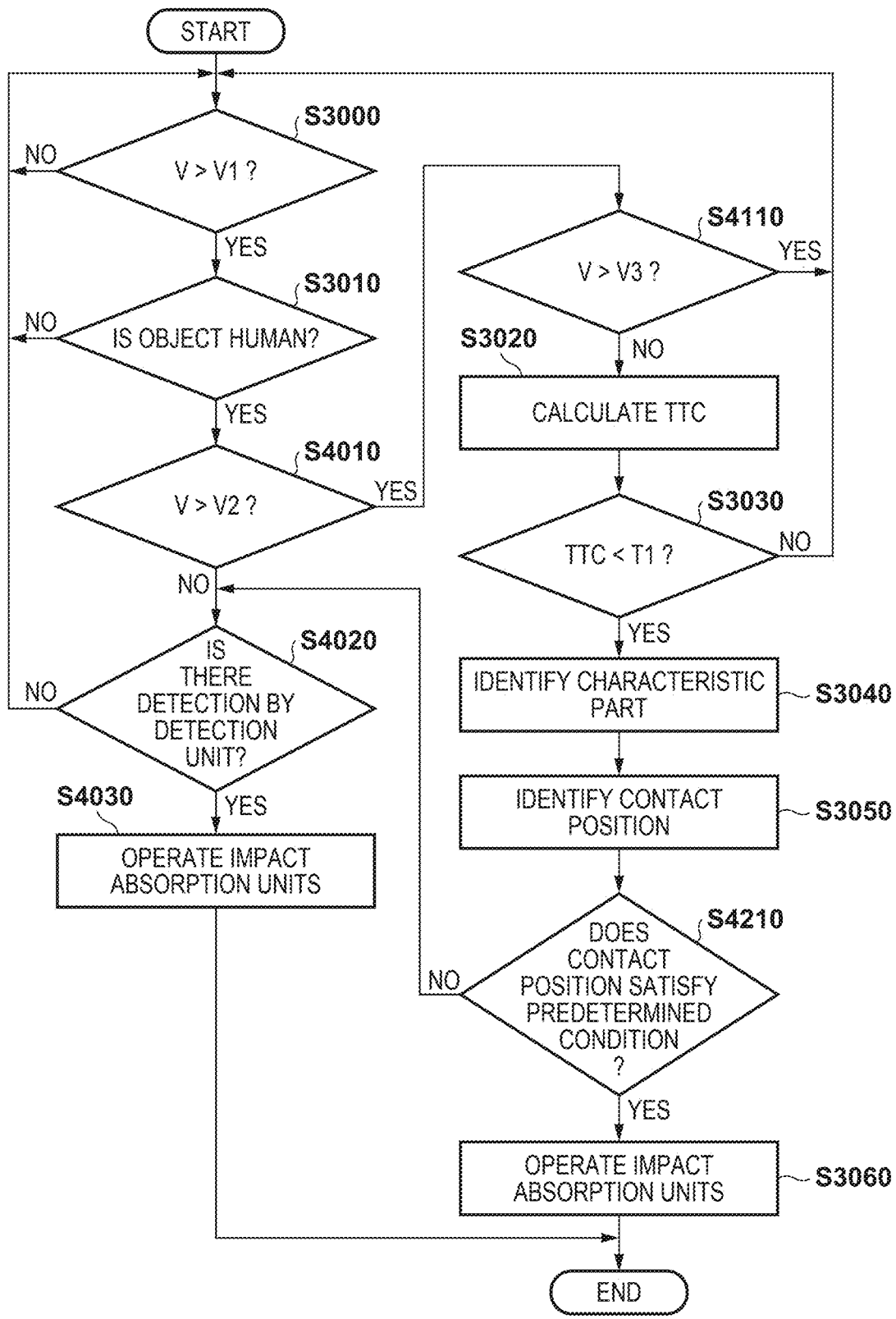
FIG. 4 is a flowchart illustrating another example of the operation method of the impact absorption unit.

FIG. 4 is a flowchart illustrating another example of the operation method for operating the plurality of impact absorption units 22. Its outline is to change operation conditions of the plurality of impact absorption units 22, based on in which of a plurality of vehicle speed ranges the vehicle speed V is included.

In S3000, it is determined whether the vehicle speed V is larger than the reference value V1. In a case where the vehicle speed V is larger than the reference value V1, the processing proceeds to S3010. In the other cases, the processing returns to S3000 (alternatively, this flowchart may be ended).

In S3010, it is determined whether the object that has been detected by the monitoring unit 23 is a human. In a case where the object is a human, the processing proceeds to S4010, and in the other cases, the processing returns to S3000.

In S4010, it is determined whether the vehicle speed V is larger than a reference value V2. It is sufficient if a value larger than the reference value V1 is set to the reference value V2. For example, 15 km/hr can be set to the reference value V1, and 30 km/hr can be set to the reference value V2. In a case where the vehicle speed V is larger than the reference value V2, the processing proceeds to S4110, and in the other cases, the processing proceeds to S4020.

In S4020, it is determined whether the detection unit 26 has detected the impact applied onto the vehicle body 10. In a case where the detection unit 26 detects the impact, the processing proceeds to S4030, and in the other cases, the processing returns to S3000.

In S4030, from among the plurality of impact absorption units 22, at least one of them corresponding to a detection result in S4020 is operated. That is, in a case where the impact is detected in any of the plurality of detection units 26, which are respectively installed in a plurality of positions of the vehicle body 10, the impact absorption unit 22 corresponding to the detection unit 26 that has detected the impact is to operate.

In S4110, it is determined whether the vehicle speed V is larger than a reference value V3. It is sufficient if a value larger than the reference value V2 is set to the reference value V3. For example, 15 km/hr can be set to the reference value V1, 30 km/hr can be set to the reference value V2, and 60 km/hr can be set to the reference value V3. In a case where the vehicle speed V is larger than the reference value V3, the processing proceeds to S3000, and in the other cases, the processing proceeds to S3020.

In S3020, the TTC of the object that has been determined as a human is calculated.

In S3030, it is determined whether the TTC is smaller than a reference value T1. In a case where the TTC is smaller than the reference value T1, the processing proceeds to S3040, and in the other cases, the processing returns to S3000.

In S3040, a characteristic part of the object that has been determined as a human is identified.

In S3050, it is identified which one of the portions 10*f*LL, 10*f*CL, 10*f*CC, 10*f*CR, and 10*f*RR in the front-side portion 10*f* of the vehicle body 10 the contact position to be contacted with the characteristic part corresponds to.

In S4210, it is determined whether the contact position to be contacted with the characteristic part identified in S3050 satisfies a predetermined condition. Here, as an example, it is assumed that whether the contact position corresponds to the front-side front surface portion 10*f*C (any of the portions 10*f*CL, 10*f*CC, and 10*f*CR) is determined. In a case where the contact position satisfies the predetermined condition (here, in a case where the contact position corresponds to the front-side front surface portion 10*f*C), the processing proceeds to S3060, and in the other cases (here, in a case where the contact position corresponds to the portion 10*f*LL or the portion IfRR), the processing proceeds to S4020.

In S3060, from among the plurality of impact absorption units 22, at least one of them corresponding to an identification result of S3050 is operated.

In briefly summarizing, when a human is detected as the object, in a case where –V≤V1 is satisfied, the operation of the impact absorption unit 22 is suppressed, in a case where –V1<V≤V2 is satisfied, the impact absorption unit 22 is operated, based on a detection result of the detection unit 26, in a case where –V2<V≤V3 is satisfied, in a case of satisfying a reference of a contact position to be contacted with the characteristic part, the impact absorption unit 22 is operated, based on a monitoring result of the monitoring unit 23, and in a case of not satisfying the reference of the contact position to be contacted with the characteristic part, the impact absorption unit 22 is operated, based on a detection result of the detection unit 26, and in a case where –V>V3 is satisfied, the operation of the impact absorption unit 22 is suppressed.

In this manner, the operation conditions of the plurality of impact absorption units 22 may be partially changed, based on the vehicle speed V, and at least one of the impact absorption units 22 may be operated under a different condition in some cases. Accordingly, more appropriate protection of the object is enabled.

Note that when the impact absorption unit 22 is operated in a case where V>V3 is satisfied, there is a possibility that the human that has been detected as the object will be moved to a distant place by the impact absorption unit 22 that has been operated. For this reason, in the present example, the operation of the impact absorption unit 22 is suppressed in the case where V>V3 is satisfied. However, as another example, the impact absorption unit 22 may be operated (S4110 may be omitted).

Fourth Example

Figure 5:
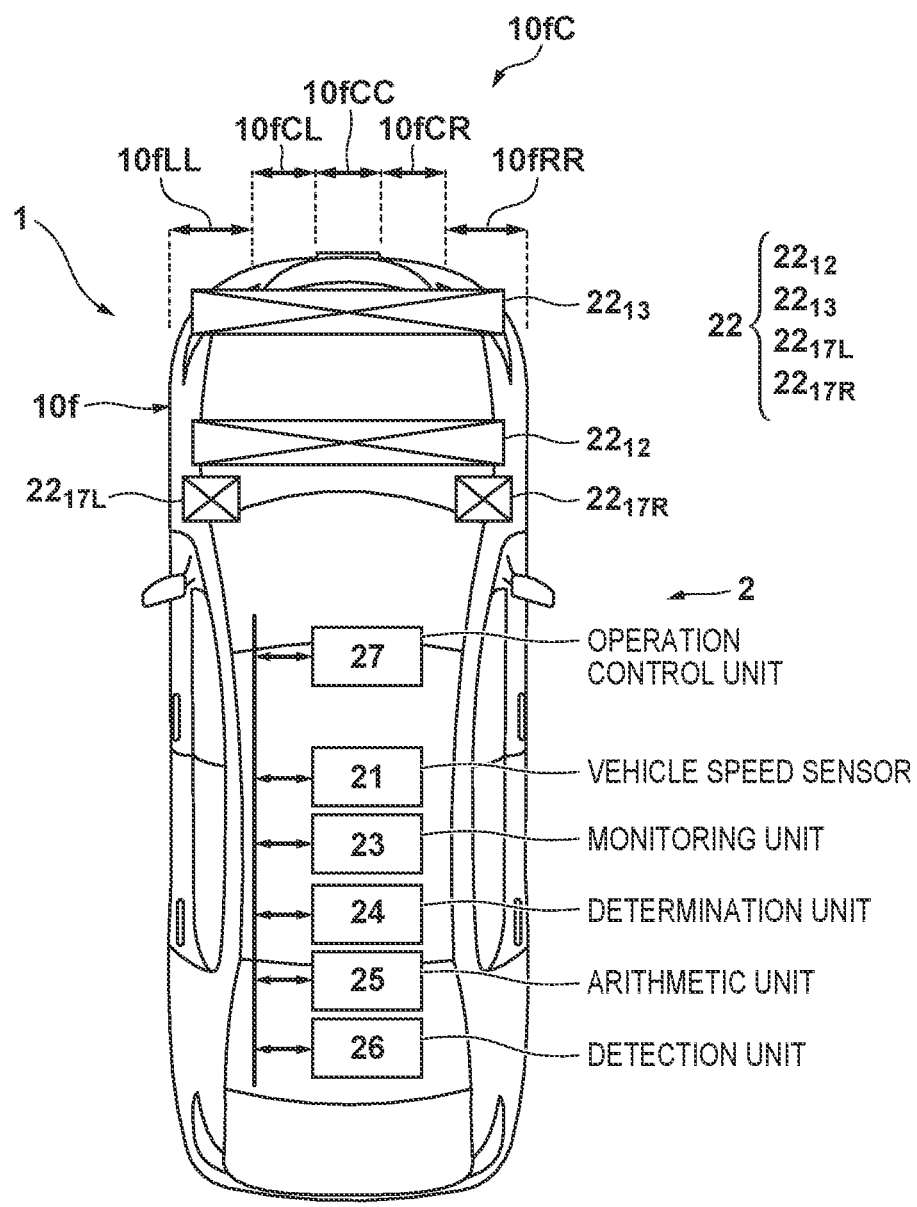
FIG. 5 is a schematic diagram illustrating another example of the configuration of the electric device group included in the vehicle.

FIG. 5 illustrates another example of an installation mode of the plurality of impact absorption units 22. In the present example, four impact absorption units 22 in total are installed to respectively correspond to the bonnet hood 12, the front bumper 13, the left-side A-pillar 17, and the right-side A-pillar 17. In the drawing, in order to facilitate understanding, from among the impact absorption units 22, the one corresponding to the bonnet hood 12 will be indicated as an impact absorption unit 22$_{12}$, the one corresponding to the front bumper 13 will be indicated as an impact absorption unit 22$_{13}$, the one corresponding to the left-side A-pillar 17 will be indicated as an impact absorption unit $22_{17L}$, and the one corresponding to the right-side A-pillar 17 will be indicated as an impact absorption unit $22_{17R}$.

As described above, it is sufficient if the plurality of impact absorption units 22 of the number according to the need may be installed, and the number is not limited to the example of FIG. 2.

The following is another example of the table indicating the correspondence relationship of the impact absorption units 22 to be operated in S3060 (see FIGS. 3 and 4). For example, from among the three characteristic parts, in a case where three characteristic parts correspond to the portion 10/LL, the impact absorption unit $22_{17L}$ is operated, in a case where two characteristic parts correspond to the portion 10/LL and one characteristic part corresponds to the portion 10/CL, the impact absorption units $22_{12}$, $22_{13}$, and $22_{17L}$ are operated, in a case where one characteristic part corresponds to the portion 10/LL and two characteristic parts correspond to the portion 10/CL, the impact absorption unit $22_{12}$, $22_{13}$, and $22_{17L}$ are operated, in a case where one to three characteristic parts correspond to any of the portions 10/CL, 10/CC, and 10/CR, the impact absorption units $22_{12}$ and $22_{13}$ are operated, in a case where two characteristic parts correspond to the portion 10/CR and one characteristic part corresponds to the portion 10/RR, the impact absorption units $22_{12}$, $22_{13}$, and $22_{17R}$ are operated, in a case where one characteristic part corresponds to the portion 10/CR and two characteristic parts correspond to the portion 10/RR, the impact absorption units $22_{12}$, $22_{13}$, and $22_{17R}$ are operated, and in a case where the three characteristic parts correspond to the portion 10/RR, the impact absorption unit $22_{17R}$ is operated.

In this manner, it is sufficient if the plurality of impact absorption units 22 of the number according to the vehicle body structure are installed, and these may be installed to respectively correspond to the bonnet hood 12, the front bumper 13, the left-side A-pillar 17, and the right-side A-pillar 17. Also in the present example, the impact absorption units 22 are selectively operated, based on the contact position to be contacted with the characteristic part (see FIGS. 3 and 4 and S3050). Thus, appropriate protection of the object is enabled.

Fifth Example

In the above-described S4210 (see FIG. 4), the description has been given with regard to the mode of determining whether the contact position corresponds to the front-side front surface portion 10/C, as the reference for determining whether the contact position to be contacted with the characteristic part satisfies the predetermined condition. However, the present invention is not limited to this example. For example, the operation conditions of the plurality of impact absorption units 22 may be changed, based on which ones or one of the portion 10/LL the contact positions of all or at least one of the three characteristic parts correspond to.

For example, from among the three characteristic parts, in a case where three characteristic parts correspond to the portion 10/LL, the impact absorption unit 2217 is operated, in a case where only two characteristic parts correspond to the portion 10/LL and when the detection unit 26 detects the impact, the impact absorption units $22_{17L}$ is operated, in a case where only one characteristic part corresponds to the portion 10/LL, the operation of the impact absorption units $22_{17L}$ is suppressed, in a case where three characteristic parts correspond to the portion 10/RR, the impact absorption units $22_{17R}$ is operated, in a case where only two characteristic parts correspond to the portion 10/RR and when the detection unit 26 detects the impact, the impact absorption units $22_{17R}$ is operated, in a case where only one characteristic part corresponds to the portion 10/RR, the operation of the impact absorption unit $22_{17R}$ is suppressed, in a case where three characteristic parts correspond to the portion 10/C (any of the portions 10/CL, 10/CC, and 10/CR), the impact absorption units $22_{12}$ and $22_{13}$ are operated, in a case where two characteristic parts correspond to the portion 10/C and one characteristic part corresponds to the portion 10/LL, the impact absorption units $22_{12}$, $22_{13}$, and $22_{17L}$ are operated, in a case where one characteristic part corresponds to the portion 10/C and two characteristic parts correspond to the portion 10/LL, and when the detection unit 26 detects the impact, the impact absorption units $22_{12}$, $22_{13}$, and $22_{17L}$ are operated, in a case where two characteristic parts correspond to the portion 10/C and one characteristic part corresponds to the portion 10/RR, the impact absorption units $22_{12}$, $22_{13}$, and $22_{17R}$ are operated, and in a case where one characteristic part corresponds to the portion 10/C and two characteristic parts correspond to the portion 10/RR, and when the detection unit 26 detects the impact, the impact absorption units $22_{12}$, $22_{13}$, and $22_{17R}$ are operated.

Here, "only" in the above description indicates a case where another characteristic part does not correspond to any of the portion 10/LL or the like.

In this manner, the operation conditions of the plurality of impact absorption units 22 are changeable by any combination of the detection result from the detection unit 26 and the monitoring result of the monitoring unit 23, and it is sufficient if the corresponding impact absorption unit 22 is operated, based on the detection result from the detection unit 26 and/or the monitoring result of the monitoring unit 23.

Note that five characteristic parts in total may be identified as described above, and in such a case, the operation conditions of the plurality of impact absorption units 22 can be changed in detail.

In addition, although all of the characteristic parts are preferably identified, even in a case where only one of the characteristic parts is identified, it becomes possible for the impact absorption unit 22 to operate in an appropriate manner. This can be said to be advantageous in a case where it is difficult to identify all of the characteristic parts from the posture of the human as the object. For example, it is assumed that the total number of the characteristic parts to be identified is N (>3), in a case where only M (1≤M<N) characteristic parts are identified, the corresponding impact absorption unit 22 may be operated based on its identification result.

In all or at least one of the cases that have been exemplified in the above-described first to fifth examples, at least one of the impact absorption units 22 to be operated may be deleted, or another one may be added. That is, within a range not departing from the gist of the embodiments, a partial change may be made to the/these operation targets in accordance with the installation position of the impact absorption unit 22. Accordingly, it becomes possible to appropriately adjust the number of components. For example, a plurality of impact absorption units 22 corresponding to the front bumper 13 may be provided to respectively correspond to the portions 10fLL, 10fCL, 10fCC, 10fCR, and 10fRR.

In the above description, each element has been given a name related to its functional aspect for facilitating the understanding. Meanwhile, each element is not limited to one having, as a main function, the function described in the embodiment, and may be one having the function as an auxiliary function. Therefore, each element is not strictly limited to the expression, and such an expression can be replaced with a similar expression. For the same purpose, the expression "apparatus" may be replaced with "unit", "component", "piece", "member", "structure", "assembly", or the like, or may be omitted.

Similarly, the processing such as determination, calculation, and identification that have been exemplified in the flowchart in the embodiments may be included in the concept of arithmetic operation, and a part of them may be rephrased as other expressions. For example, identification may be expressed as estimation, prediction, extraction, or the like.

The features in the above-described embodiments can be summarized as follows.

[1]
A first aspect in a first mode relates to a vehicle (for example, 1), and the vehicle includes:
  a monitoring unit (for example, 23) configured to monitor a surrounding environment of a vehicle body (for example, 10);
  a detection unit (for example, 26) configured to detect an impact applied onto the vehicle body;
  a plurality of impact absorption units (for example, 22); and
  an operation control unit (for example, 27) configured to selectively operate the plurality of impact absorption units, based on at least one of a monitoring result from the monitoring unit and a detection result from the detection unit. Accordingly, it becomes possible to enhance the accuracy and increase the speed of the operation of the impact absorption unit, and more appropriate protection of the object is enabled.

In a second aspect,
a vehicle speed sensor (for example, 21) configured to detect a vehicle speed is further included, in which
the operation control unit selectively operates the plurality of impact absorption units, in a case where the detection result of the vehicle speed sensor satisfies a reference. Accordingly, the first aspect is achievable in a more appropriate manner.

In a third aspect,
a determination unit (for example, 24) configured to determine whether an object that is likely to come into contact with the vehicle body is a human is further included, in which
in a case where the determination unit determines that the object is the human, the operation control unit selectively operates the plurality of impact absorption units, based on the monitoring result from the monitoring unit regardless of the detection result from the detection unit. Accordingly, the first aspect is achievable in a more appropriate manner.

In another aspect,
the determination unit determines the object located within a range corresponding to the detection result of the vehicle speed sensor. Accordingly, the first aspect is achievable in a more appropriate manner.

In another aspect,
the plurality of impact absorption units is installed to correspond to a plurality of portions of the vehicle body. Accordingly, the first aspect is achievable in a more appropriate manner.

In another aspect,
at least some of the plurality of impact absorption units are installed at different positions from each other in a height direction. Accordingly, the first aspect is achievable in a more appropriate manner.

In another aspect,
at least some of the plurality of impact absorption units are installed at different positions from each other in a vehicle width direction. Accordingly, the first aspect is achievable in a more appropriate manner.

In a fourth aspect,
the plurality of impact absorption units includes:
  a first unit (for example, $22_{CL}$, $22_{CC}$, and $22_{CR}$) configured to operate to correspond to a front-side front surface portion of the vehicle body;
  a second unit (for example, 22 and $22_{LL}$) configured to operate to correspond to a front-side left lateral portion of the vehicle body; and
  a third unit (for example, 22 and $22_{RR}$) configured to operate to correspond to a front-side right lateral portion of the vehicle body. Accordingly, the first aspect is achievable in a more appropriate manner.

In a fifth aspect,
the determination unit is further capable of determining which position in a front-side portion of the vehicle body the object is likely to come into contact with, and
the operation control unit selectively operates the first to third units, based on a determination result. Accordingly, the first aspect is achievable in a more appropriate manner.

In a sixth aspect,
in a case where the determination unit determines that the object is a human and $V \leq V1$ is satisfied, where V represents a vehicle speed and V1 represents a predetermined threshold,
operations of the first to third units are suppressed. Accordingly, the fifth aspect is achievable in a more appropriate manner.

In a seventh aspect,
in a case where $V1 < V \leq V2$ is satisfied, where V2 represents another predetermined threshold and V2 is larger than V1,
the first to third units are operated, based on the detection result from the detection unit. Accordingly, the sixth aspect is achievable in a more appropriate manner.

In an eighth aspect,
in a case where $V2 < V \leq V3$ is satisfied, where V3 represents still another threshold and V3 is larger than V2,
in a case where a position in a front-side portion of the vehicle body with which the object is likely to contact satisfies the reference, the first to third units are selectively operated, based on the monitoring result from the monitoring unit, and in a case where the position does not satisfy the reference, the first to third units are selectively operated, based on the detection result from the detection unit. Accordingly, the seventh aspect is achievable in a more appropriate manner.

In a ninth aspect, in a case where V is larger than V3, the operations of the first to third units are suppressed. Accordingly, the seventh aspect is achievable in a more appropriate manner.

In a tenth aspect, a bonnet hood (for example, 12);

a front bumper (for example, 13); and an A-pillar (for example, 17) interposed between a windshield (for example, 15) and a door glass (for example, 16) are further included, in which at least some of the plurality of impact absorption units are respectively installed to correspond to the bonnet hood, the front bumper, and the A-pillar. Accordingly, the first aspect is achievable in a more appropriate manner.

In an eleventh aspect, as an area for determining a contact position of the vehicle to be contacted with an object that is likely to come into contact with a vehicle body, a front-side portion of the vehicle includes:

a first area (for example, 10/CC) set in a predetermined range from a center in a vehicle width direction of the vehicle;

a pair of left and right second areas (for example, 10/CL and 10/CR) each having a predetermined range to be respectively set outward from left and right ends of the first area; and a pair of left and right third areas (for example, 10/LL and 10/RR) to be respectively set outward from the pair of left and right second areas. Accordingly, the same effects as those of the fifth aspect is achievable in a more appropriate manner.

In a twelfth aspect, in a case where the contact position corresponds to the first area, the operation control unit operates the impact absorption units corresponding to the bonnet hood and the front bumper. Accordingly, the eleventh aspect is achievable in a more appropriate manner.

In a thirteenth aspect, in a case where the contact position corresponds to the second area, the operation control unit operates the impact absorption units corresponding to the A-pillar, the bonnet hood, and the front bumper. Accordingly, the eleventh aspect is achievable in a more appropriate manner.

In a fourteenth aspect, in a case where the contact position corresponds to the third area and the object that is likely to come into contact with the vehicle body is a human, the operation control unit operates an impact absorption unit corresponding to the A-pillar. Accordingly, the eleventh aspect is achievable in a more appropriate manner.

[2]

A first aspect in a second mode relates to a vehicle (for example, 1), and the vehicle includes:

a monitoring unit (for example, 23) configured to monitor a surrounding environment of a vehicle body;

a plurality of impact absorption units (for example, 22);

an arithmetic unit (for example, 25) configured to identify at least two characteristic parts of an object, in a case where the object is likely to come into contact with the vehicle body, based on a monitoring result of the monitoring unit, and configured to identify contact positions of the vehicle body to be respectively contacted with the at least two characteristic parts that have been identified; and an operation control unit (for example, 27) configured to selectively operate the plurality of impact absorption units, based on the contact positions that have been identified. Accordingly, it becomes possible to enhance the accuracy and increase the speed of the operation of the impact absorption unit, and more appropriate protection of the object is enabled.

In a second aspect, a determination unit (for example, 24) configured to determine whether the object is a human is further included, in which in a case where the determination unit determines that the object is the human, the operation control unit operates the plurality of impact absorption units (for example, 22). Accordingly, the first aspect is achievable in a more appropriate manner.

In a third aspect, in the case where the determination unit determines that the object is the human, the arithmetic unit identifies a neck part and a shoulder part as the at least two characteristic parts. Accordingly, the first aspect is achievable in a more appropriate manner.

In a fourth aspect, the arithmetic unit further identifies a leg part as the at least two characteristic parts. Accordingly, the third aspect is achievable in a more appropriate manner.

In a fifth aspect, the arithmetic unit identifies which any of the at least two characteristic parts is likely to come into contact with any of a front-side front surface portion, a front-side left lateral portion, and a front-side right lateral portion of the vehicle body, and the operation control unit operates the plurality of impact absorption units, based on an identification result. Accordingly, the first aspect is achievable in a more appropriate manner.

In another aspect, the plurality of impact absorption units is installed to correspond to a plurality of portions of the vehicle body. Accordingly, the first aspect is achievable in a more appropriate manner.

In another aspect, at least some of the plurality of impact absorption units are installed at different positions from each other in a height direction. Accordingly, the first aspect is achievable in a more appropriate manner.

In another aspect, at least some of the plurality of impact absorption units are installed at different positions from each other in a vehicle width direction. Accordingly, the first aspect is achievable in a more appropriate manner.

In a sixth aspect, the plurality of impact absorption units includes:

a first unit (for example, $22_{CL}$, $22_{CC}$, and $22_{CR}$) corresponding to a front-side front surface portion of the vehicle body;

a second unit (for example, 22 and $22_{LL}$) corresponding to a front-side left lateral portion of the vehicle body; and a third unit (for example, 22 and $22_{RR}$) corresponding to a front-side right lateral portion of the vehicle body. Accordingly, the first aspect is achievable in a more appropriate manner.

In a seventh aspect, the arithmetic unit is further capable of identifying which position in a front-side portion of the vehicle body the object is likely to come into contact with, and the operation control unit selectively operates the first to third units, based on a determination result. Accordingly, the first aspect is achievable in a more appropriate manner.

In an eighth aspect, a bonnet hood (for example, 12);

a front bumper (for example, 13); and an A-pillar (for example, 17) interposed between a windshield (for example, 15) and a door glass (for example, 16) are further included, in which at least some of the plurality of impact absorption units are respectively installed to correspond to the bonnet hood, the front bumper, and the A-pillar. Accordingly, the first aspect is achievable in a more appropriate manner.

In a ninth aspect, in a case where contact positions of the vehicle body to be contacted with all of the at least two characteristic parts correspond to a front-side front surface portion of the vehicle body, the operation control unit operates the impact absorption units corresponding to the front bumper and the bonnet hood. Accordingly, the eighth aspect is achievable in a more appropriate manner.

In a tenth aspect, in a case where a contact position of the vehicle body to be contacted with at least one of the at least two characteristic parts corresponds to a front-side front surface portion of the vehicle body, and in a case where a contact position of the vehicle body to be contacted with another one of the at least two characteristic parts corresponds to either a front-side left lateral portion or a front-side right lateral portion of the vehicle body, the operation control unit operates the impact absorption units corresponding to the front bumper, the bonnet hood, and the A-pillar. Accordingly, the eighth aspect is achievable in a more appropriate manner.

In an eleventh aspect, a detection unit configured to detect an impact applied onto the vehicle body is further included, in which in a case where a contact position of the vehicle body to be contacted with at least one of the at least two characteristic parts corresponds to either a front-side left lateral portion or a front-side right lateral portion of the vehicle body, and in a case where the detection unit detects the impact, the operation control unit operates the impact absorption units corresponding to the front bumper, the bonnet hood, and the A-pillar. Accordingly, the eighth aspect is achievable in a more appropriate manner.

In a twelfth aspect, in a case where contact positions of the vehicle body to be contacted with all of the at least two characteristic parts correspond to either a front-side left lateral portion or a front-side right lateral portion, the operation control unit operates an impact absorption unit corresponding to the A-pillar. Accordingly, the eighth aspect is achievable in a more appropriate manner.

In a thirteenth aspect, in a case where none of contact positions of the vehicle body to be contacted with the at least two characteristic parts corresponds to a front-side front surface portion, and in a case where a contact position of the vehicle body to be contacted with at least one of the at least two characteristic parts corresponds to either a front-side left lateral portion or a front-side right lateral portion of the vehicle body, the operation control unit suppresses operations of the plurality of impact absorption units. Accordingly, the eighth aspect is achievable in a more appropriate manner.

In a fourteenth aspect, a detection unit configured to detect an impact applied onto the vehicle body is further included, in which in a case where none of contact positions of the vehicle body to be contacted with the at least two characteristic parts corresponds to a front-side front surface portion, in a case where a contact position of the vehicle body to be contacted with at least one of the at least two characteristic parts corresponds to either a front-side left lateral portion or a front-side right lateral portion, and in a case where the detection unit detects the impact, the operation control unit operates an impact absorption unit corresponding to the A-pillar. Accordingly, the eighth aspect is achievable in a more appropriate manner.

In a fifteenth aspect, a detection unit configured to detect an impact applied onto the vehicle body is further included, in which in a case where none of contact positions of the vehicle body to be contacted with the at least two characteristic parts corresponds to a front-side front surface portion, in a case where a contact position of the vehicle body to be contacted with at least one of the at least two characteristic parts corresponds to either a front-side left lateral portion or a front-side right lateral portion, and in a case where the detection unit detects no impact, the operation control unit suppresses operations of the plurality of impact absorption units. Accordingly, the eighth aspect is achievable in a more appropriate manner.

The invention is not limited to the foregoing embodiments, and various variations/changes are possible within the spirit of the invention.

What is claimed is:

1. A vehicle comprising:
a plurality of impact absorption units;
a monitor configured to monitor a surrounding environment of a vehicle body, the surrounding environment including presence/absence of an object around the vehicle body;
a plurality of detectors, which correspond to the plurality of impact absorption units, each detector configured to detect an impact applied onto the vehicle body when the object comes into contact with the vehicle body; and
an operation controller configured to selectively operate the plurality of impact absorption units, wherein,
where V represents a vehicle speed, and $V1<V2<V3$ is satisfied,
in a case where $V \leq V1$ or $V>V3$, the operation controller suppresses operating the plurality of impact absorption units, in a case where V1≤V≤V2, after at least one detector among the plurality of detectors detects the impact, the operation controller operates, among the plurality of impact absorption units, at least one impact absorption unit corresponding to the at least one detector, and in a case where V2≤V<V3, the operation controller specifies a portion of the vehicle body with which the object comes into contact based on a monitoring result from the monitor, and
  (i) in a case where the portion is a predetermined portion of the vehicle body, the operation controller operates, among the plurality of impact absorption units, at least one impact absorption unit corresponding to the portion, before at least one detector among the plurality of detectors detects the impact, and
  (ii) in a case where the portion is not the predetermined portion of the vehicle body, after at least one detector among the plurality of detectors detects the impact, the operation controller operates, among the plurality of impact absorption units, at least one impact absorption unit corresponding to the at least one detector.

2. The vehicle according to claim 1, further comprising a vehicle speed sensor configured to detect a vehicle speed.

3. The vehicle according to claim 1, further comprising a determiner configured to determine whether an object that is likely to come into contact with the vehicle body is a human, wherein
in a case where the determiner determines that the object is the human, the operation controller selectively operates the plurality of impact absorption units.

4. The vehicle according to claim 3, wherein
the plurality of impact absorption units includes:
a first unit configured to operate to correspond to a front-side front surface portion of the vehicle body;
a second unit configured to operate to correspond to a front-side left lateral portion of the vehicle body; and
a third unit configured to operate to correspond to a front-side right lateral portion of the vehicle body.

5. The vehicle according to claim 4, wherein
the determiner is further capable of determining which position in a front-side portion of the vehicle body the object is likely to come into contact with, and the operation controller selectively operates the first to third units, based on a determination result from the determiner.

6. The vehicle according to claim 1, further comprising:
a bonnet hood;
a front bumper; and
an A-pillar interposed between a windshield and a side glass, wherein
each of the bonnet hood, the front bumper and the A-pillar corresponds to the portion, and
at least some of the plurality of impact absorption units are respectively installed to correspond to the bonnet hood, the front bumper, and the A-pillar.

7. The vehicle according to claim 6, wherein
as an area for determining a contact position of the vehicle to be contacted with an object that is likely to come into contact with the vehicle body, a front-side portion of the vehicle includes:
a first area set in a predetermined range from a center in a vehicle width direction of the vehicle;
a pair of left and right second areas each having a predetermined range to be respectively set outward from left and right ends of the first area; and
a pair of left and right third areas to be respectively set outward from the pair of left and right second areas.

8. The vehicle according to claim 7, wherein
in a case where the contact position corresponds to the first area, the operation controller operates the impact absorption units corresponding to the bonnet hood and the front bumper.

9. The vehicle according to claim 7, wherein
in a case where the contact position corresponds to the second area, the operation controller operates the impact absorption units corresponding to the A-pillar, the bonnet hood, and the front bumper.

10. The vehicle according to claim 7, wherein
in a case where the contact position corresponds to the third area and the object that is likely to come into contact with the vehicle body is a human, the operation controller operates an impact absorption unit corresponding to the A-pillar.

\* \* \* \* \*